United States Patent
Schroath et al.

(10) Patent No.: US 6,973,597 B2
(45) Date of Patent: Dec. 6, 2005

(54) METHOD AND APPARATUS FOR REBOOTING A PRINTER

(75) Inventors: Leonard T. Schroath, Boise, ID (US); Bradley J. Anderson, Boise, ID (US); Bruce L. Johnson, Eagle, ID (US); William I. Herrmann, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 10/002,003

(22) Filed: Dec. 5, 2001

(65) Prior Publication Data

US 2003/0105995 A1  Jun. 5, 2003

(51) Int. Cl.[7] .............................................. G06F 11/00
(52) U.S. Cl. ........................................ 714/44; 399/18
(58) Field of Search ............................ 714/44; 399/18

(56) References Cited

U.S. PATENT DOCUMENTS

| | | | | |
|---|---|---|---|---|
| 4,339,657 A | * | 7/1982 | Larson et al. | 714/704 |
| 4,553,478 A | * | 11/1985 | Greiner et al. | 101/484 |
| 4,866,712 A | * | 9/1989 | Chao | 714/704 |
| 5,208,814 A | * | 5/1993 | Ulrich et al. | 714/47 |
| 5,313,455 A | * | 5/1994 | van der Wal et al. | 370/232 |
| 5,620,264 A | * | 4/1997 | Kagita | 400/74 |
| 5,913,090 A | * | 6/1999 | Sawada et al. | 399/8 |
| 6,202,158 B1 | * | 3/2001 | Urano et al. | 713/201 |
| 6,430,616 B1 | * | 8/2002 | Brinnand et al. | 709/224 |
| 6,666,594 B2 | * | 12/2003 | Parry | 400/74 |

* cited by examiner

Primary Examiner—Bryce P. Bonzo (57) ABSTRACT

A printer error is detected and logged in an error log. If the same printer error has occurred within a predetermined time period, an error message is generated on the printer's control panel and a network administrator is notified of the printer errors. If the same printer error has not occurred within the predetermined time period, the printer is rebooted. If the same printer error has occurred a predetermined number of consecutive times, an error message is generated on the printer's control panel and a network administrator is notified of the printer errors. If the same printer error has not occurred a predetermined number of times, the printer is rebooted.

22 Claims, 5 Drawing Sheets

METHOD AND APPARATUS FOR REBOOTING A PRINTER

TECHNICAL FIELD

The present invention relates to methods and systems that reboot a printer after a particular error or sequence of errors is detected.

BACKGROUND

Printers occasionally fail to operate properly for various reasons. Bugs in the firmware or software of the printer may cause intermittent printer errors. An improperly formatted print job may cause a printer to malfunction. Additionally, a broken component or device within the printer may cause the printer to malfunction. Some printer errors, such as a memory leak, are corrected by resetting or power-cycling the printer, while other printer errors, such as an uncleared paper jam, are typically repeated after the printer is reset or power-cycled.

In a network environment, a particular printer is typically shared by multiple users. In this network environment, the multiple users generally must walk a short distance to retrieve print jobs from the printer. If a particular user walks to retrieve a print job and finds that a printer error has occurred, the user might be required to reset or power-cycle the printer, return to their computer to resend the print job, and return to the printer to see if the print job printed correctly. Alternatively, the user may be required to return to the printer at a later time if a print spooler attempts to reprint the print job which caused the error. These activities are frustrating and time-consuming to the user, especially when the printer error appears to be intermittent.

Further, when multiple users share a printer, the users may not recognize patterns in the manner in which the printer fails. While a user of a personal printer might recognize that a particular print job or sequence of print jobs causes a printer error, multiple users sharing a printer may not be able to observe such a pattern because they are typically unaware of all print jobs and all printer errors. For example, one user may clear a printer error by power-cycling the printer. A few minutes later, a different user may clear the same printer error by power-cycling the printer. Thus, even though the same error occurred within a short period of time, the two users are unaware of this pattern.

The invention described herein addresses these problems by automatically rebooting the printer in certain situations and detecting particular patterns in the printer errors.

SUMMARY

By automatically rebooting the printer and detecting patterns in the printer errors, the methods and systems described herein increase the chance that a print job will print successfully without user intervention. For example, when a memory leak occurs, rebooting the printer causes memory to be reclaimed, which may allow the print job to print properly. Further, the methods and systems reduce the frustration and time expended by the user because many error situations are handled automatically and do not require a user to power-cycle the printer and resend one or more print jobs.

In a particular embodiment, a printer error is detected and logged in an error log. If the same printer error has occurred within a predetermined time period, an error message is generated on the printer's control panel. If the same printer error has not occurred within the predetermined time period, the printer is rebooted.

In a described embodiment, if the same printer error has occurred within the predetermined time period, a network administrator is notified of the printer errors.

In another embodiment, a printer error is detected and logged in an error log. If the same printer error has occurred a predetermined number of consecutive times, an error message is generated on the printer's control panel. If the same printer error has not occurred a predetermined number of consecutive times, the printer is rebooted.

In a particular embodiment, logging the printer error in an error log includes recording an identification of the print job being handled when the printer error occurred.

In another embodiment, logging the printer error in an error log includes recording an error type associated with the printer error.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The systems and methods described herein detect patterns in printer errors and, in certain situations, automatically reboot the printer without requiring any user or network administrator intervention. For example, if different error messages are received in consecutive error messages, the printer may be rebooted instead of generating an error message on the printer control panel. Alternatively, if the same error message has not been received twice within a predetermined time period, the printer may be rebooted instead of generating an error message.

Figure 1:
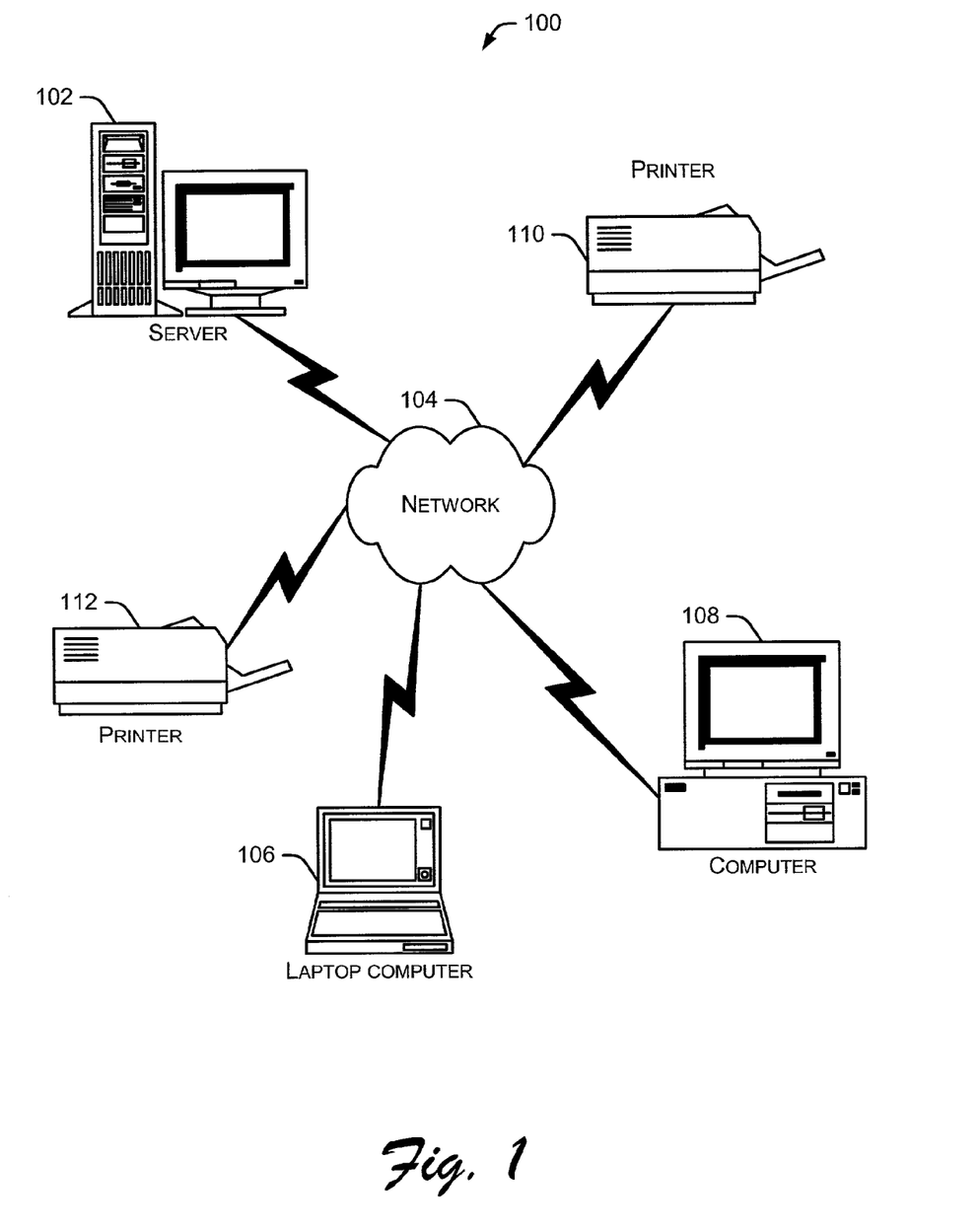
FIG. 1 illustrates an exemplary network environment in which the methods and systems described herein may be implemented.

FIG. 1 illustrates an exemplary network environment 100 in which the methods and systems described herein may be implemented. Network environment 100 includes a server 102, a network 104, client computers 106 and 108, and printers 110 and 112. Server 102 contains various documents, application programs, and data that may be distributed via network 104. Network 104 may be any type of data communication network utilizing any network topology and any network communication protocol. For example, network 104 may be a local area network (LAN), a wide area network (WAN), or the Internet. Additionally, network 104 may be a combination of two or more different networks.

Client computers 106 and 108 are also coupled to network 104. Client computers 106 and 108 communicate with server 102, printers 110 and 112, and with one another via network 104. Although client computer 106 is illustrated as a laptop computer and client computer 108 is illustrated as a desktop computer, client computers 106 and 108 can be any type of computing device, including a palmtop computer, a personal digital assistant (PDA), a cellular phone, a set top box, or other device. Although a single server 102 and two client computers 106 and 108 are shown in FIG. 1, a particular environment may include any number of servers and any number of client computers coupled to one another.

Printers 110 and 112 are capable of receiving print jobs from any device coupled to network 104. In the example of FIG. 1, printers 110 and 112 receive print jobs from server 102 and client computers 106 and 108. The printers illustrated in FIG. 1 are laser printers. However, the methods and systems discussed herein can be applied to any type of printer. A typical printer may include one or more input trays (or input devices) and one or more output trays (or output devices). As used herein, a printer refers to any type of device that can generate an image (e.g., a letter, a picture, a drawing, etc.) on any type of print media, such as paper, cardstock, plastic, or fabric. Example devices include impact printers, non-impact printers, digital copiers, analog copiers, facsimile machines, press machines, silk screen machines, etc. A printer may also be referred to herein as a "printing device".

Although FIG. 1 illustrates a network environment, the systems and methods described herein are applicable to any printer coupled to any type of computing device, such as a printer coupled to a desktop computer using a parallel cable, universal serial bus (USB) cable, or other communication medium.

Figure 2:
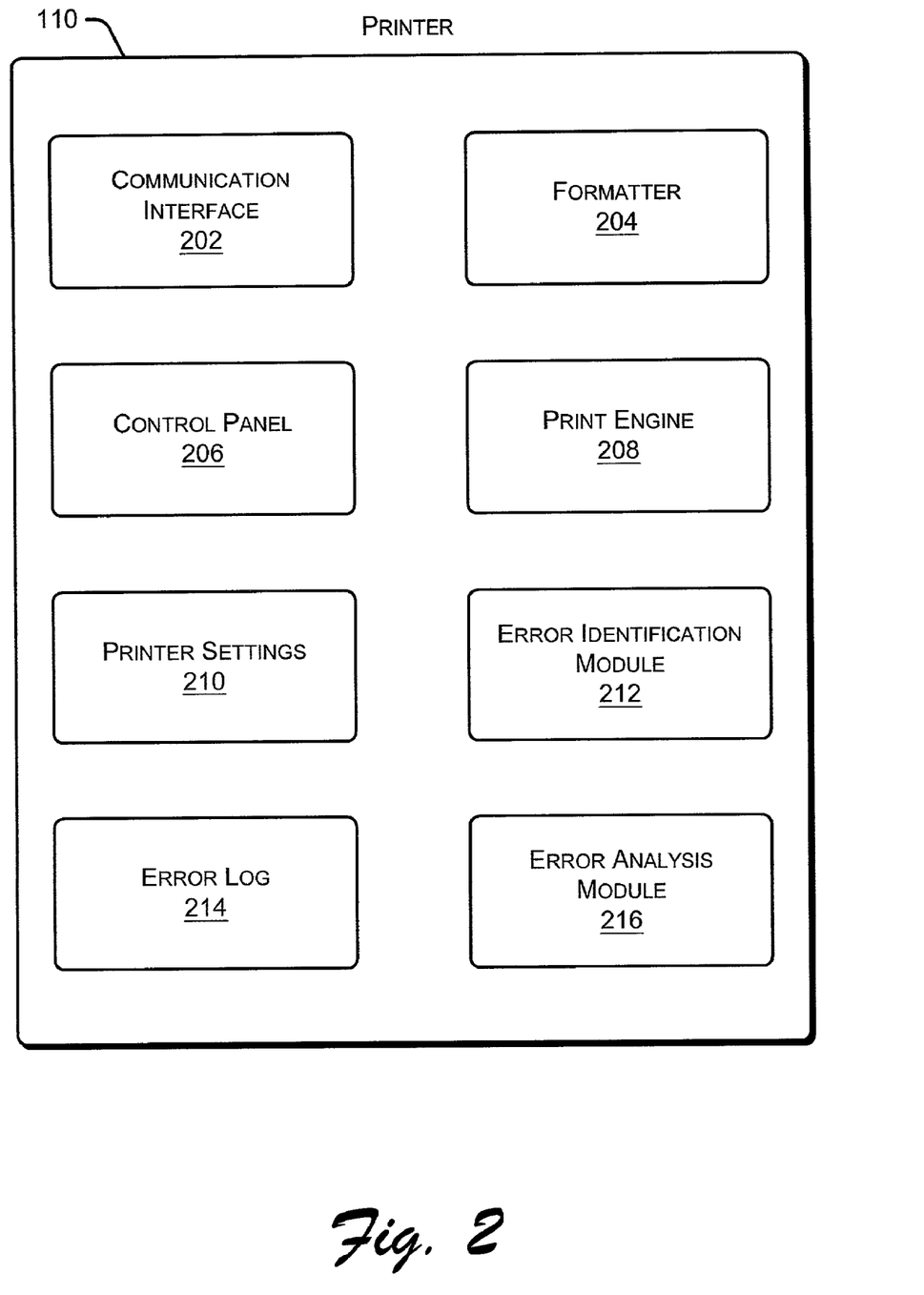
FIG. 2 is a block diagram illustrating pertinent portions of an example printer.

FIG. 2 is a block diagram illustrating pertinent portions of an example printer 110. Printer 110 includes a communication interface 202, which allows the printer to communicate with other devices coupled to network 104 (FIG. 1). Printer 110 also includes a formatter 204, which formats a document or other data into a stream of data that is understood by a print engine 208. A control panel 206 provides an interface that allows a user to communicate with the printer. For example, control panel 206 includes buttons or similar sensors to allow a user to select print options or print features. Control panel 206 also includes a graphical display or textual display to communicate information to users of the printer. For example, a graphical display may display error messages or other warnings when printer problems are detected.

In alternate embodiments, the control panel 206 may include one or more lights (such as light-emitting diodes (LEDs)) that indicate printer errors and/or printer status. These lights may be used in place of or in addition to a graphical or textual display. In other embodiments, the printer may generate an error message that is communicated to another device (e.g., a particular computer), a user, or an application program (such as an error notification program that notifies particular users or systems when printer errors occur).

The print engine 208 receives a sheet of paper (or other media) and prints the desired data or image on the paper. The print engine then outputs the sheet of paper to an output tray or other output of the printer. Printer 110 also includes printer settings 210, which define the operation of the printer in certain circumstances. Example printer settings include the default printing language, the default font, the default paper source, and the like. Other printer settings may define the manner in which certain printer errors are handled, as discussed in greater detail below.

Printer 110 also includes an error identification module 212, which identifies printer errors and logs the printer errors in an error log 214. Error log 214 may include information such as the date and time of the printer error, the type of error, and the print job being processed at the time of the error. Additionally, an error analysis module 216 analyzes printer errors stored in error log 214 and can generate various messages on control panel 206 and may generate status messages or error messages that are communicated to, for example, a network administrator responsible for the printer. One or more printer settings 210 may define the manner in which error analysis module 216 operates. Error analysis module 216 is capable of detecting patterns in the data stored in error log 214. These patterns are discussed in greater detail below.

Figure 3:
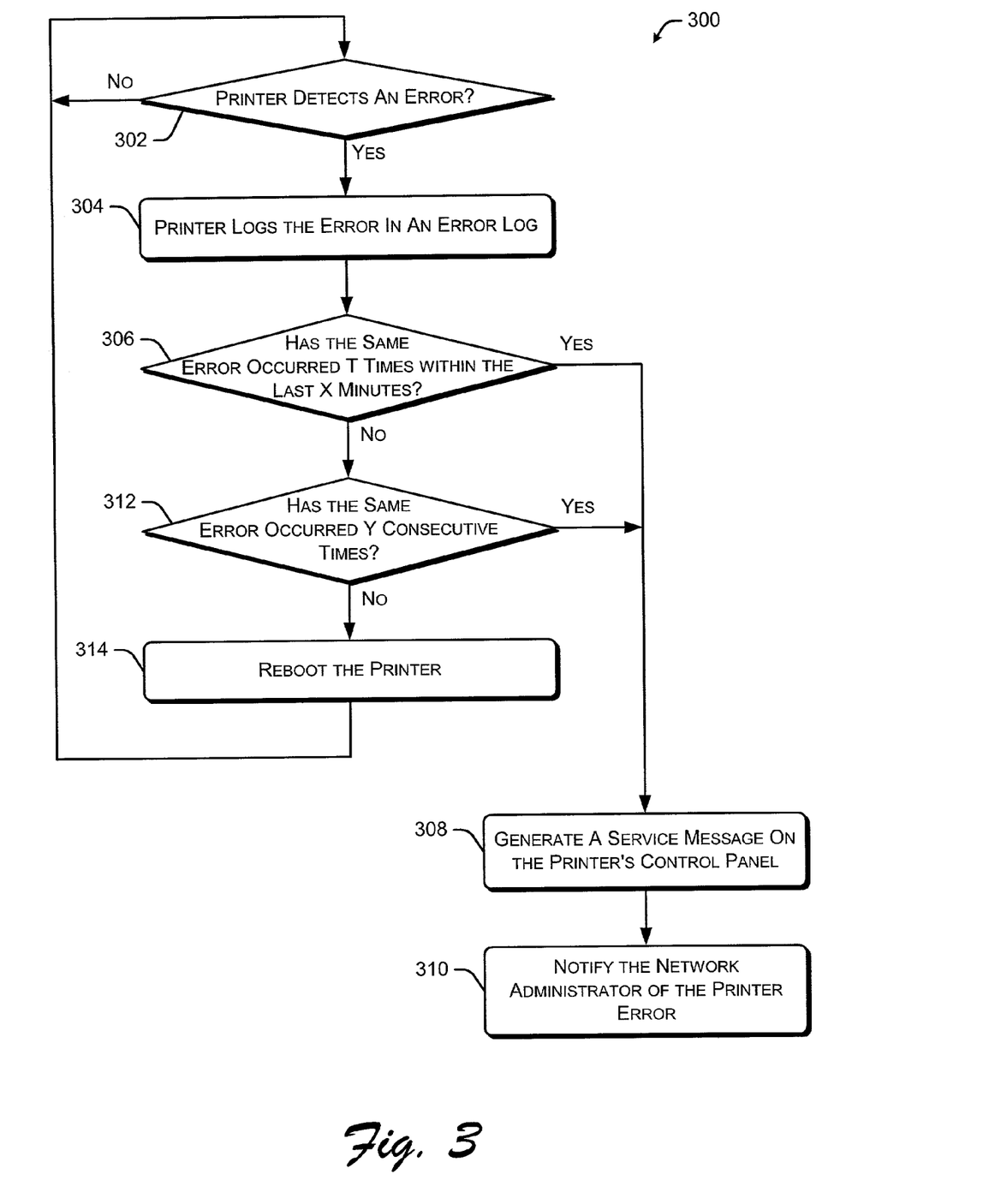
FIG. 3 is a flow diagram illustrating a procedure for handling printer errors.

FIG. 3 is a flow diagram illustrating a procedure 300 for handling printer errors. In one embodiment, procedure 300 is implemented by printer 110 (FIGS. 1 and 2). Initially, the procedure determines whether the printer has detected an error (block 302). If an error has not been detected, the procedure continues to check for a detected error. If an error is detected, the procedure continues to block 304, where the printer logs the error in an error log (such as error log 214 in FIG. 2).

The procedure 300 then determines whether the same error has occurred T times within the last X minutes (block 306). If the same error occurs a particular number of times (T) within a predetermined time period (X minutes), the error is likely to be a problem with the printer rather than a problem with a particular print job. For example, if the same formatter error occurs twice within a five minute period, the error is presumed to be with the printer. If the same error occurs T times within the last X minutes, the procedure 300 generates an error message on the printer's control panel (block 308) and notifies the network administrator of the printer error (block 310). The error message indicates that there is a likely problem with the printer that needs to be serviced, such as "Error—Contact Service Department." The values assigned to "T" and "X" may vary depending on the printer usage and other factors determined by the network administrator. In one embodiment, the values assigned to "T" and "X" are stored with the printer settings 210 (FIG. 2).

If the same error has not occurred T times within the last X minutes, procedure 300 continues to determine whether the same error has occurred Y consecutive times (block 312). If the same error occurs several consecutive times, the error is likely to be a problem with the printer rather than a problem with a particular print job. For example, if the same error occurs four consecutive times, the error is presumed to be associated with the printer instead of a particular print job. The time period assigned to "Y" varies depending on the usage of the printer and other factors determined by the network administrator. The value assigned to "Y" may be stored with the printer settings 210. If the same error occurs Y consecutive times, procedure 300 generates an error message on the printer's control panel (block 308) and notifies the network administrator of the printer error (block 310).

If the same error has not occurred Y consecutive times, procedure 300 continues to block 314, which reboots the printer. In this situation, since the same error has not occurred T times within the last X minutes and the same error has not occurred Y consecutive times, the procedure presumes that the error is associated with a particular print job or is an intermittent error. In this situation, rebooting the printer is likely to solve the problem. If the same error occurs next or T times within a predetermined time period, the procedure (i.e., block 306 or 312) will cause an error message to be displayed on the printer's control panel and will cause the network administrator to be notified of the error. Automatically rebooting the printer (at block 314) eliminates the need for a user to manually reboot or power-cycle the printer.

In an alternate embodiment, if the same error has occurred T times within the last X minutes or has occurred Y consecutive times, the procedure determines whether the same print job caused the errors. If so, the procedure deletes the print job and awaits the next error. By deleting the print job that has caused multiple errors, the procedure attempts to determine whether the problem is associated with the printer or the particular print job. If the same error occurs (T times within X minutes or Y consecutive times) after deleting the print job, the procedure presumes that the problem is with the printer rather than the print job. If the same error does not occur after deleting the print job, the procedure presumes that the problem was with the print job rather than the printer.

In another embodiment, after rebooting the printer at block 314, the procedure attempts to reprint the print job that was being processed when the last printer error occurred. This reduces the likelihood that a user will have to reprint the print job.

Figure 4:
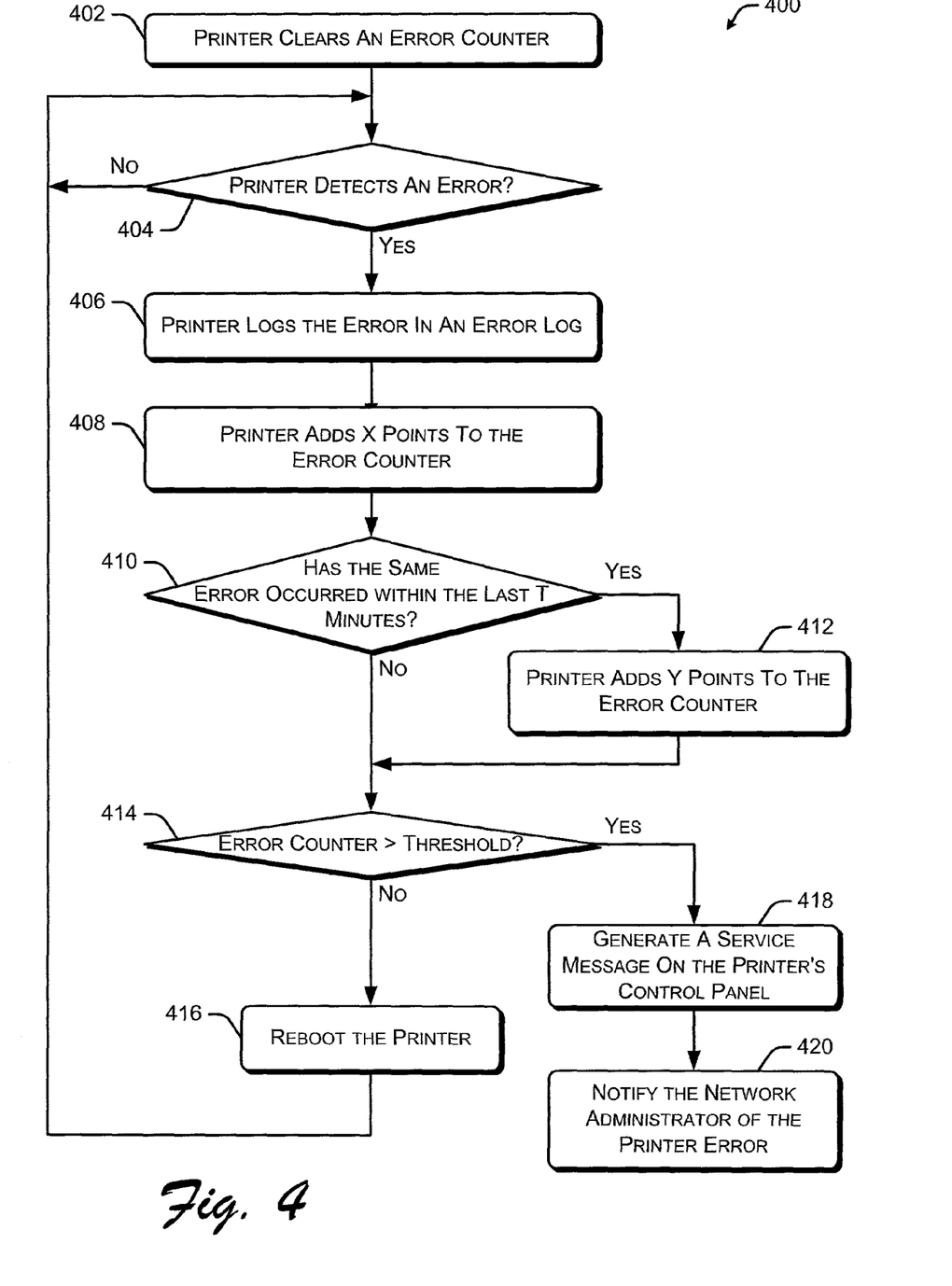
FIG. 4 is a flow diagram illustrating a another procedure for handling printer errors.

FIG. 4 is a flow diagram illustrating a another procedure 400 for handling printer errors. Initially, procedure 400 clears an error counter (block 402). The error counter tracks errors detected by a particular printer. The procedure then determines whether the printer has detected an error (block 404). If not, the procedure returns to block 404 until an error is detected. If an error is detected, the procedure 400 continues to block 406, which logs the error in an error log. Next, the printer adds "X" points to the error counter (block 408). The value of "X" may vary from one error to another depending on the severity of the error. For example, a severe error (such as a paper jam) may have a high "X" value, while a less severe error has a lower "X" value.

At block 410, the procedure determines whether the same error has occurred within the last T minutes. If so, the procedure continues to block 412, which adds "Y" points to the error counter. At block 414, the procedure determines whether the current value of the error counter is greater than a predetermined threshold. This threshold is typically determined by the network administrator or other network operator. If the error counter is not greater than the predetermined threshold, the procedure reboots the printer (block 416) and returns to block 404 to await the next error. The value of "Y" may vary from one error to another depending on the severity of the error.

If the error counter is greater than the predetermined threshold, the procedure generates an error message on the printer's control panel (block 418) and notifies the network administrator of the printer failure (block 420). A network administrator or other user may reset the error counter after an error has occurred. A network administrator or other user may also reset the error counter at other times (e.g., after analyzing error data in an error log).

Figure 5:
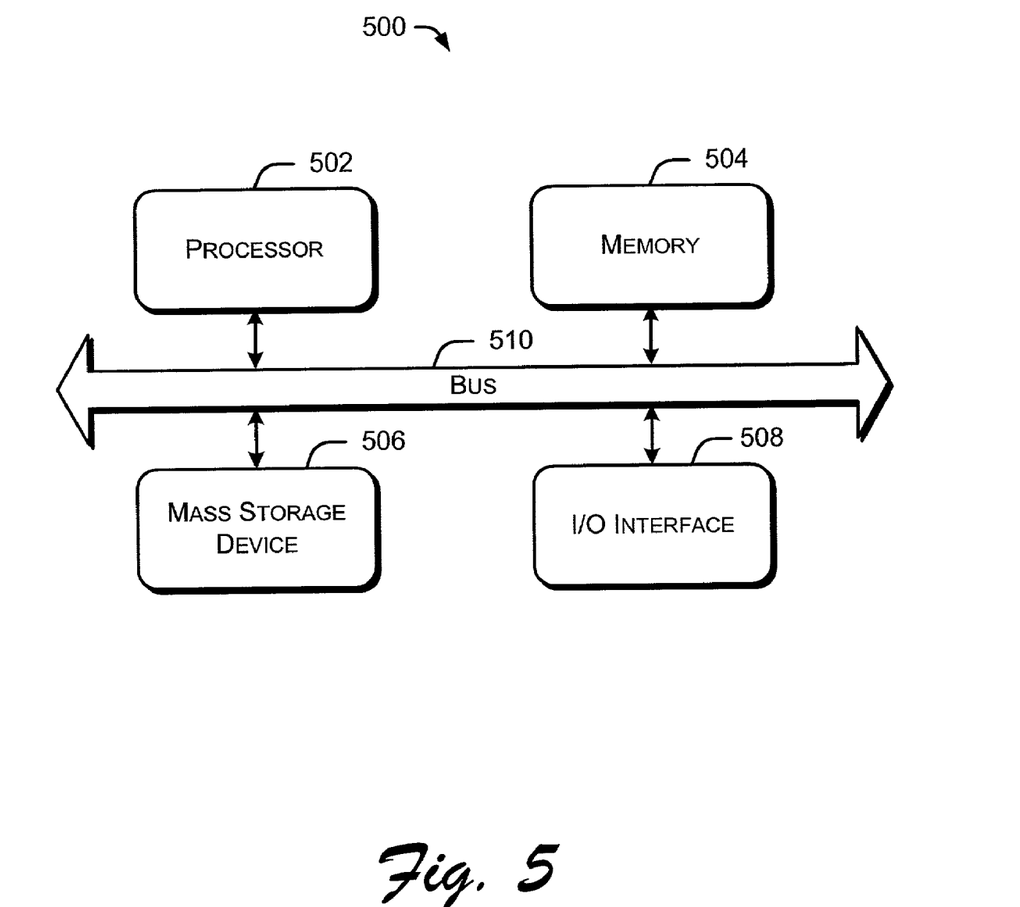
FIG. 5 is a block diagram of a computer system that can be utilized in accordance with one or more embodiments described herein.

FIG. 5 is a block diagram of a computer system 500 that can be utilized in accordance with one or more embodiments described herein. Computer system 500 can be, for example, a server such as server 102 and/or a client computer such as client computers 106 or 108 of FIG. 1. Computer system 500 represents a wide variety of computing devices, such as desktop computers, portable computers, dedicated server computers, multi-processor computing devices, cellular telephones, personal digital assistants (PDAs), handheld or pen-based computers, microcontroller-based electronic devices, gaming consoles, and so forth.

Computer system 500 includes one or more processors 502, memory 504, a mass storage device 506, and an input/output (I/O) interface 508, all coupled to a bus 510. Bus 510 represents one or more buses in computer system 500, such as a system bus, processor bus, accelerated graphics port (AGP), peripheral component interconnect (PCI), and so forth. The bus architecture can vary by computing device as well as by manufacturer. I/O interface 508 is a conventional interface allowing components of computer system 500 (e.g., processor(s) 502) to communicate with other computing devices, such as via network 104 of FIG. 1. I/O interface 508 may be, for example, a modem, a network interface card (NIC), and so forth.

Memory 504 represents volatile and/or nonvolatile memory used to store instructions and data for use by processor 502. Typically, instructions are stored on mass storage device 506 (or nonvolatile memory) and loaded into a volatile memory 504 for execution by processor(s) 502. Additional memory components may also be involved, such as cache memories internal or external to processor 502. Various embodiments can be implemented, at different times, in any of a variety of computer readable media that is part of, or readable by, computer system 500. For example, such computer readable media may be mass storage device 506, memory 504 or a cache memory, a removable disk (not shown) that is accessible by processor 502, or another controller of computer system 500 (such as a magnetic disk or optical disk), and so forth.

Computer system 500 is exemplary only. It is to be appreciated that additional components (not shown) can be included in computer system 500 and some components illustrated in computer system 500 need not be included. For example, a display adapter, additional processors or storage devices, additional I/O interfaces, and so forth may be included in computer system 500, or mass storage device 506 may not be included.

The discussions herein refer to software components and modules that can be executed by a computing device. It is to be appreciated, however, that the components and processes described herein can be implemented in software, firmware, hardware, or a combination thereof. By way of example, a programmable logic device (PLD) or an application specific integrated circuit (ASIC) could be configured or designed to implement various components and/or processes discussed herein.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:
   detecting a printer error;
   if the printer error has occurred a predetermined number of times within a predetermined time period, generating an error message; and
   if the printer error has not occurred a predetermined number of times within the predetermined time period, rebooting the printer.

2. A method as recited in claim 1 further comprising if the printer error has occurred a predetermined number of consecutive times, generating an error message.

3. A method as recited in claim 1 wherein rebooting the printer further includes identifying a print job that was printing during the detected printer error and attempting to reprint the identified print job.

4. A method as recited in claim 1 further comprising logging the printer error in an error log.

5. A method as recited in claim 1 further comprising if the printer error has occurred a predetermined number of times within the predetermined time period, notifying a network administrator of the printer errors.

6. A method as recited in claim 4 wherein logging the printer error in an error log includes recording a date and time that the printer error occurred.

7. A method as recited in claim 4 wherein logging the printer error in an error log includes recording an identification of the print job being handled when the printer error occurred.

8. A method as recited in claim 4 wherein logging the printer error in an error log includes recording an error type associated with the printer error.

9. A method comprising:
 detecting a printer error;
 logging the printer error in an error log;
 if the printer error has occurred a predetermined number of consecutive times, generating an error message; and
 if the printer error has not occurred a predetermined number of consecutive times, rebooting the printer.

10. A method as recited in claim 9 further comprising if the printer error has occurred a predetermined number of times within a predetermined time period, generating an error message.

11. A method as recited in claim 9 further comprising if the printer error has occurred a predetermined number of consecutive times, notifying a network administrator of the printer errors.

12. A method as recited in claim 9 wherein rebooting the printer further includes identifying a print job that was printing during the detected printer error and attempting to reprint the identified print job.

13. A method comprising:
 detecting a printer error;
 adding X points to a printer error counter;
 adding Y points to the printer error counter if a common error occurred within a predetermined time period;
 determining whether the printer error counter exceeds a threshold value; and
 rebooting the printer if the printer error counter does not exceed the threshold value.

14. A method as recited in claim 13 further comprising notifying a network administrator of the printer errors if the printer error counter exceeds the threshold value.

15. A method as recited in claim 13 wherein rebooting the printer includes identifying a print job that was printing when the printer error was detected and attempting to reprint the identified print job.

16. A method as recited in claim 13 wherein the value of X varies depending on the type of printer error detected.

17. A method as recited in claim 13 wherein the value of Y varies depending on the type of printer error detected.

18. A printer comprising:
 a control panel configured to display information to a user of the printer;
 an error log configured to store information regarding printer errors detected by the printer;
 an error analysis module configured to analyze printer errors stored in the error log; and
 wherein the error analysis module is further configured to reboot the printer if a particular printer error has not occurred a predetermined number of times within a predetermined time period.

19. A printer as recited in claim 18 wherein the error analysis module is further configured to generate an error message on the control panel if a particular printer error has occurred twice within the predetermined time period.

20. A printer as recited in claim 18 wherein the error log stores a date and time that the printer error occurred.

21. A printer as recited in claim 18 wherein the error log stores an error type associated with the printer error.

22. A printer as recited in claim 18 wherein the error log stores information regarding the print job being processed when the printer error occurred.

* * * * *

UNITED STATES PATENT AND TRADEMARK OFFICE
CERTIFICATE OF CORRECTION

PATENT NO. : 6,973,597 B2  Page 1 of 1
APPLICATION NO. : 10/002003
DATED : December 6, 2005
INVENTOR(S) : Leonard T. Schroath et al.

It is certified that error appears in the above-identified patent and that said Letters Patent is hereby corrected as shown below:

In column 7, line 41, in Claim 13, delete "a common" and insert -- the same printer --, therefor.

Signed and Sealed this

Seventh Day of July, 2009

JOHN DOLL
*Acting Director of the United States Patent and Trademark Office*